(12) United States Patent
Wang (10) Patent No.: US 8,495,801 B2
(45) Date of Patent: Jul. 30, 2013

(54) CLAMPING DEVICE

(76) Inventor: Dennis H. Wang, Baldwin Park, CA (US)

( * ) Notice: Subject to any disclaimer, the term of this patent is extended or adjusted under 35 U.S.C. 154(b) by 276 days.

(21) Appl. No.: 12/645,621

(22) Filed: Dec. 23, 2009

(65) Prior Publication Data

US 2010/0229355 A1 Sep. 16, 2010

(30) Foreign Application Priority Data

Mar. 11, 2009 (TW) .............................. 98107940 A (51) Int. Cl.
*F16L 23/08* (2006.01)

(52) U.S. Cl.
USPC ............................... 24/284; 24/280; 285/367

(58) Field of Classification Search
USPC .... 24/279, 280, 284, 285; 285/367; 74/502.2, 74/551.1
See application file for complete search history.

(56) References Cited

U.S. PATENT DOCUMENTS

| 2,828,525 A * | 4/1958 | Gail ................................. 24/279 |
| 5,653,481 A * | 8/1997 | Alderman ...................... 285/363 |
| 6,676,095 B2 * | 1/2004 | Dal Pra' ..................... 248/230.3 |
| 2008/0247818 A1 | 10/2008 | Oesch et al. .................. 403/389 |

FOREIGN PATENT DOCUMENTS

TW M346623 12/2008

OTHER PUBLICATIONS

Chinese Utility Model No. 2285387, Jul. 1, 1998, 10 pages.
Chinese Utility Model No. 2937598, Aug. 22, 2007, 12 pages.
German Invention Publication No. DE 19834768 A1, Feb. 3, 2000, 12 pages.
Japanese Invention Patent Publication No. JP2005009552 A, Jan. 13, 2005, 6 pages.
Taiwanese Utility Model Publication No. M316948, Aug. 11, 2007, 6 pages.
Taiwanese Utility Model Publication No. 410859, Nov. 1, 2000, 4 pages.
Taiwanese Utility Model Publication No. 282035, Jul. 21, 1996, 2 pages.

* cited by examiner

*Primary Examiner* — Robert J Sandy
*Assistant Examiner* — Michael Lee
(74) *Attorney, Agent, or Firm* — Alan Kamrath; Kamrath IP Lawfirm, P.A.

(57) ABSTRACT

A clamping device includes a holding member including a space for allowing an item to be disposed therein, and a tightening mechanism operable to make the holding member clamp the item in the holding member. The space is varied in size depending upon the external diameter of the clamped item. Additionally, the tightening mechanism is provided for enabling a satisfactory securing condition for any size of items.

11 Claims, 10 Drawing Sheets

CLAMPING DEVICE

BACKGROUND OF THE INVENTION

1. Field of the Invention

The present invention relates to a clamping device and, in particular, to a clamping device including a holding member having a space for allowing an item to be disposed therein and a tightening mechanism operable to make the holding member clamp the item in the holding member. Additionally, the space is varied in size depending upon the external diameter of the clamped item.

2. Description of the Related Art

Figure 10:
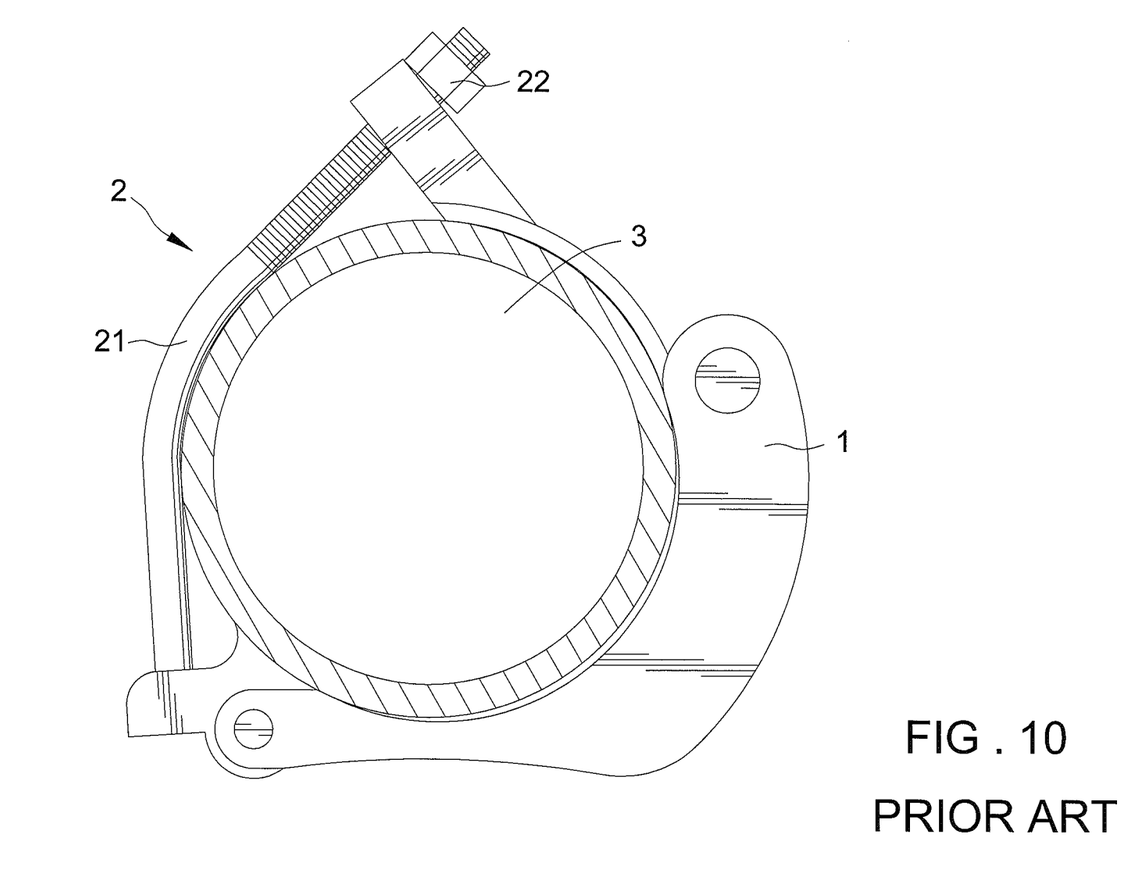
FIG. 10 shows a conventional clamping device.

FIG. 10 shows a clamping device disclosed in TW Pat. No. M346623. The clamping device includes a holding member 1, a tightening mechanism 2 including a pivot arm 21 connected to the holding member 1 and including a threaded section, and an adjusting member 22 including a threaded section engaged with the threaded section of the pivot arm 21. The holding member 1 and the pivot arm 21 of the tightening mechanism 2 cooperate to form a space 3 in which an item can be disposed. In this regard, the adjusting member 22 is threaded on the pivot arm 21 until it abuts the holding member 1, thereby clamping the item in the space 3. However, it is encountered that only if the adjusting member 22 abuts the holding member 1 and accomplishes a surface contact would the item be securely held in the space. In this regard, when the clamping device clamps an item which has a larger external diameter, the adjusting member 22 would only accomplish a line contact with the holding member 1, as shown in FIG. 10. As a result, the item can not be held securely in the space.

The present invention is, therefore, intended to obviate or at least alleviate the problems encountered in the prior art.

SUMMARY OF THE INVENTION

According to the present invention, a holding member includes a space in which an item is adapted to be disposed. A tightening mechanism is engaged with the holding member and is operable to make the holding member clamp the item therein. The holding member has its inner peripheral wall, which delimits the space, embracing and abutting against the outer peripheral edge of the clamped item. Additionally, the holding member includes a first concaved cavity and a second concaved cavity defined therein. Each of the first and second concaved cavities has an arcuate surface having a cross section defining an arcuate edge. Furthermore, the tightening mechanism includes a male coupling member and a female coupling member engaged with the male coupling member. The male coupling member is inserted through the first and second concaved cavities and includes a head end engaged in the first concaved cavity. The head end has an arcuate surface contacting with the arcuate surface of the first concaved cavity. Additionally, the female coupling member includes a body which has an engaging end engaged in the second concaved cavity. The engaging end has an arcuate surface contacting with the arcuate surface of the second concaved cavity. Moreover, the space has a size that is varied by adjusting the tightening mechanism.

It is an object of the present invention to provide a clamping device that enables a satisfactory securing condition for any size of items.

It is another object of the present invention that the arcuate surface of the first concaved cavity and the arcuate surface of the head end of the male coupling member enable automatic alignment of the male coupling member in the first concaved cavity, and that the arcuate surface of the second concaved cavity and the arcuate surface of the engaging end of the female coupling member enable automatic alignment of the female coupling member in the second concaved cavity.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE DRAWINGS

For the present disclosure to be easily understood and readily practiced, the present disclosure will now be described in conjunction with the following figures, wherein.

DETAILED DESCRIPTION OF THE PREFERRED EMBODIMENTS

Figure 4:
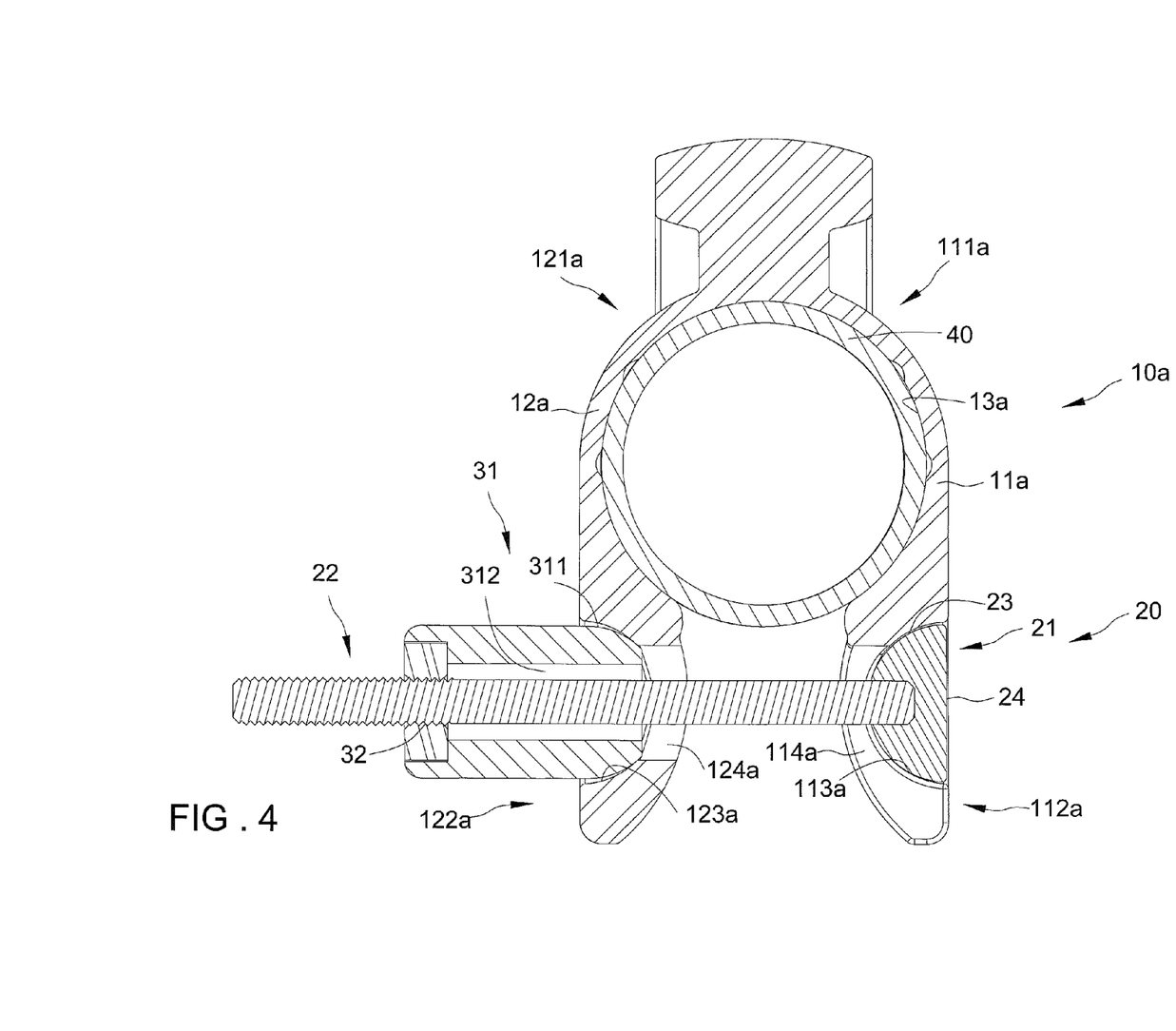
FIG. 4 is a cross-sectional view taken along line 4-4 of FIG. 3.
Figure 5:
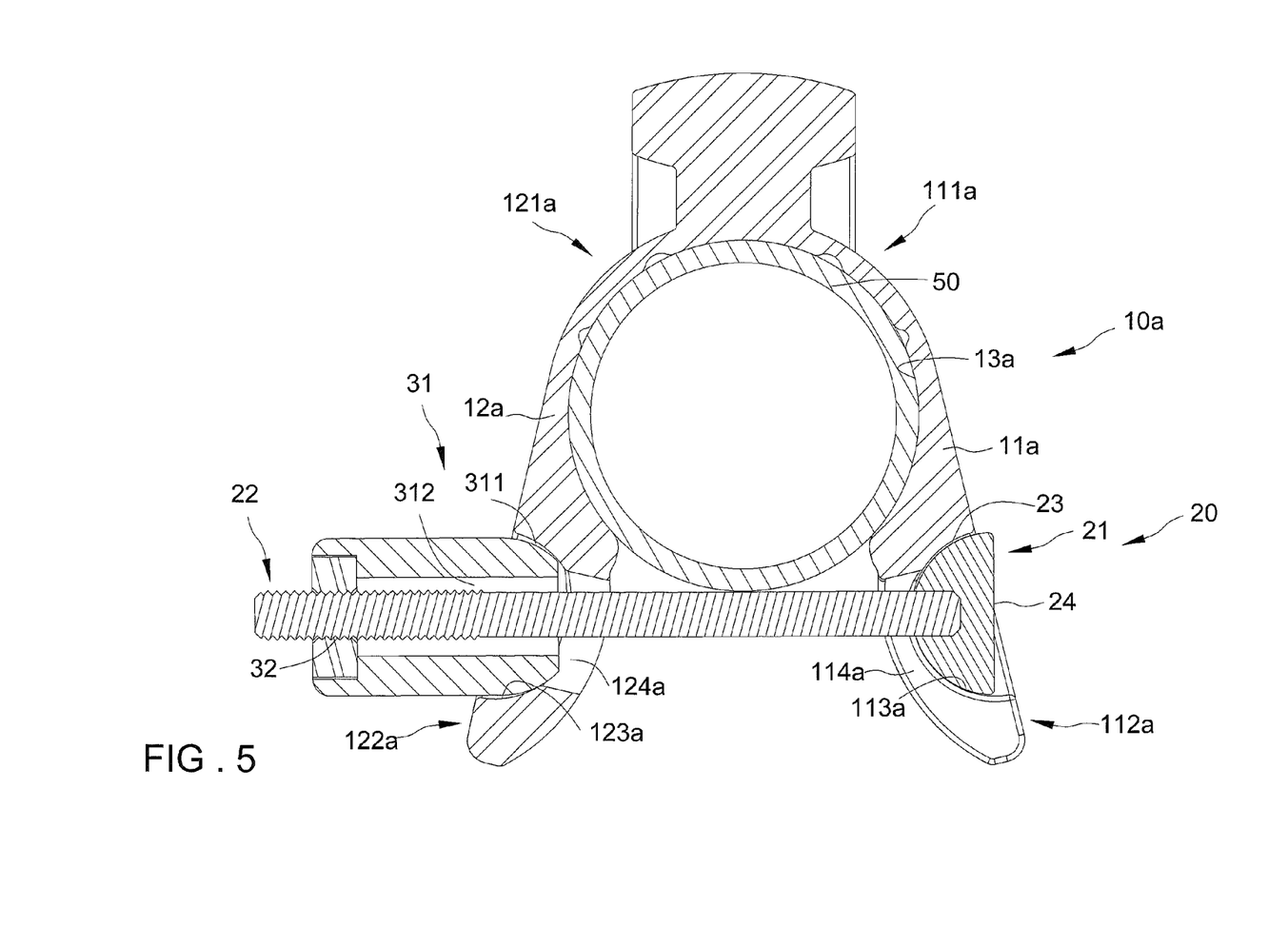
FIG. 5 is a cross-sectional view showing another application of the clamping device, with the clamping device fixed to an item that has a larger external diameter than that of the item shown in FIG. 3.

Referring to the FIGS. 1 through 5, a clamping device in accordance with a first embodiment of the present invention includes a holding member 10a including a space 13a in which an item 40, 50 is adapted to be disposed. The clamping device further includes a tightening mechanism operable to make the holding member 10a clamp the item 40, 50 therein. The holding member 10a includes an inner peripheral wall, which delimits the space 13a, embracing and abutting against an outer peripheral edge of the clamped item 40, 50. The space 13a is varied in size depending upon the external diameter of the outer peripheral edge of the clamped item 40, 50 as shown in FIGS. 4 and 5.

Figure 1:
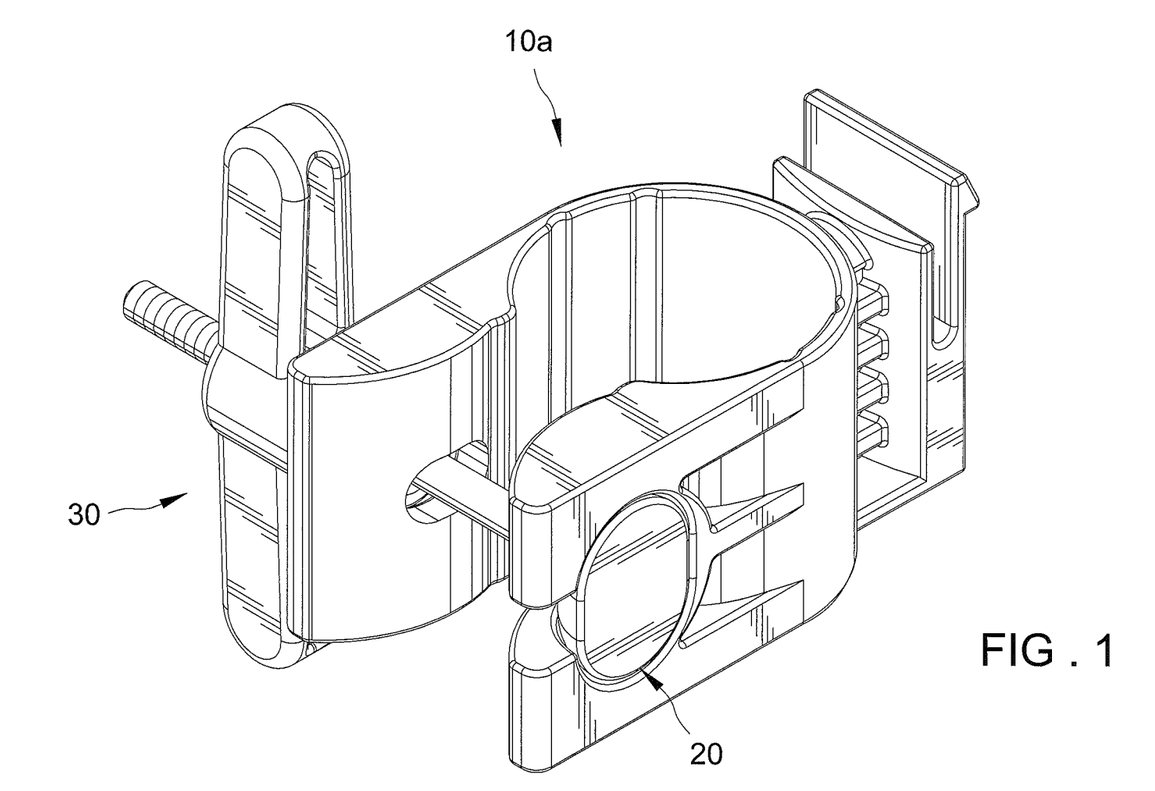
FIG. 1 is a perspective view of a clamping device in accordance with a first embodiment of the present invention.
Figure 2:
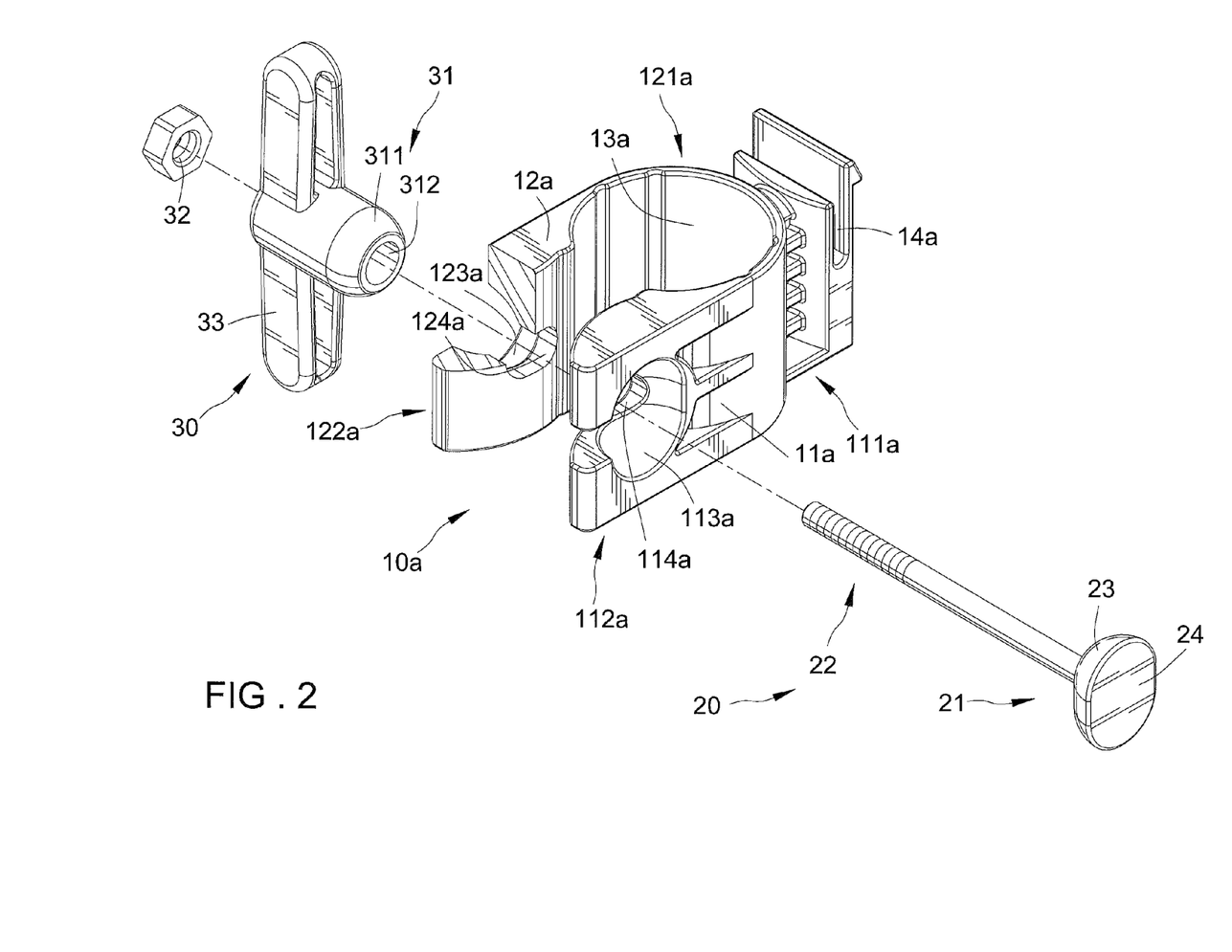
FIG. 2 is an exploded perspective view of the clamping device shown in FIG. 1.
Figure 3:
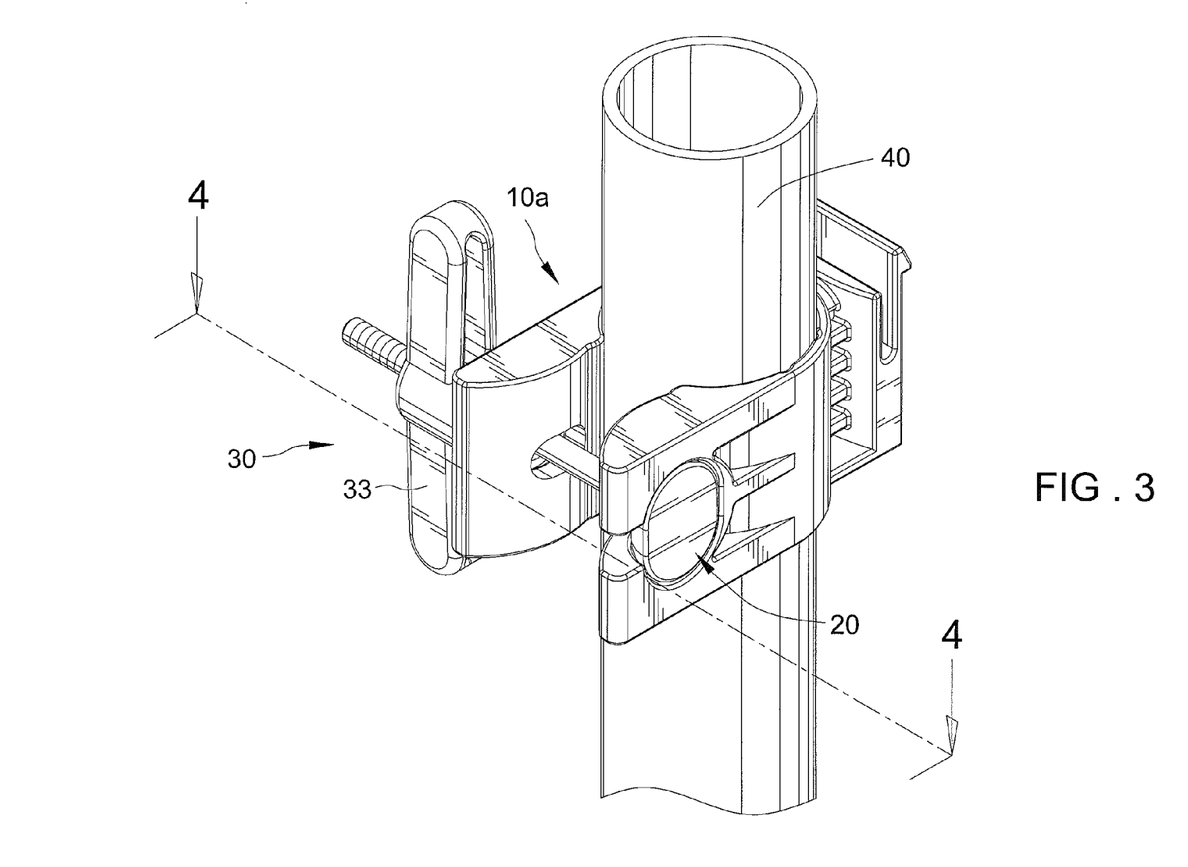
FIG. 3 shows an application of the clamping device, with the clamping device fixed to an item.

The holding member 10a has a cross section, which is substantially transverse to the longitudinal length of the item 40, 50 clamped therein, including an open end. Additionally, the holding member 10a includes a first arm and a second arms 11a, 12a. The first 11a and second 12a arms are disposed symmetrically with respect to each other.

In addition, the first arm 11a includes a proximal end 111a, and the second arm 12a includes a proximal end 121a connected to the proximal end 111a. Further, the first arm 11a includes a distal end 112a, and the second arm 12a includes a distal end 122a spaced from the distal end 112a. Preferably, the first and second arms 11a, 12a are formed as an integral piece made from a single material. Furthermore, the space 13a is defined adjacent to the proximal ends 111a, 121a of the first and second arms 11a, 12a.

Furthermore, the tightening mechanism is engaged with the distal ends 112a, 122a of the first and second arms 11a, 12a. As will be set forth hereafter, the tightening mechanism would provide a satisfactory securing condition for any size of items 40, 50.

Specifically, the first arm 11a includes a concaved cavity 113a recessed from a side, which is defined by an outer peripheral wall of the holding member 10a, and extending in an axial direction which extends transversely to the first and second arms 11a, 12a. The concaved cavity 113a includes an arcuate surface having a cross section defining an arcuate edge, and an opening exposed to outside. The opening has a cross section which defines a linear edge and which is flush with the outer peripheral wall of the holding member 10a. Thus, as to the cross section of the concaved cavity 113a, the arcuate edge would join two opposing ends of the linear edge, gradually curves inwardly and reduces in diametrical size. The tightening mechanism includes a male coupling member 20 inserted through the distal end 112a of the first arm 11a. The male coupling member 20 includes a head end 21 disposed on one side of the first arm 11a and a tail end 22, which is opposite to the head end 21, disposed on the opposite side of the first arm 11a. Additionally, the male coupling member 20 is inserted through the distal end 122a of the second arm 12a such that the tail end 22 is disposed outside the second arm 12a, or more specifically, a side of the second arm 12a which is defined by the outer peripheral wall of the holding member 10a.

Furthermore, the head end 21 of the male coupling member 20 is engaged in the concaved cavity 113a. The head end 21 has a shape forming an arcuate surface 23 which conforms to the arcuate surface of the concaved cavity 113a. Additionally, the head end 21 includes a top surface 24 having a cross section defining a linear edge. As shown in FIG. 4, the concaved cavity 113a may completely receive the head end 21 of the male coupling member 20 such that the head end 21 does not protrude above the outer peripheral wall of the holding member 10a. The cross sectional view in FIG. 4 also shows that the arcuate surface 23 and the concaved cavity 113a cooperate to form an interconnecting surface having an arcuate cross section. Additionally, FIG. 5 shows that when the item 50 clamped in the space 13a is with a larger external diameter as compared to that of the item 40 shown in FIG. 4, the first and second arms 11a, 12a are no longer parallel to each other. Nevertheless, the arcuate surface 23 and the concaved cavity 113a still cooperate to form an interconnecting surface having an arcuate cross section.

Furthermore, the first arm 11a may include a slot 114a defined therein depending upon if the concaved cavity 113a would extend through the first arm 11a in order to allow the male coupling member 20 to be inserted through the first arm 11a. So, if the concaved cavity 113a does not extend through the first arm 11a, the first arm 11a would include the slot 114a extending from the concaved cavity 113a to the internal peripheral wall of the holding member 10a such that the male coupling member 20 is able to be inserted through the first arm 11a. Additionally, the slot 114a has two opposing ends, with one of the ends closed, and with the other end defining an opening at the distal end 112a of the first arm 11a.

Likewise, the second arm 12a includes a concaved cavity 123a recessed from a side defined by the outer peripheral wall of the holding member 10a and extending in an axial direction which extends transversely to the first and second arms 11a, 12a. The concaved cavity 123a has an arcuate surface having a cross section defining an arcuate edge, and an opening exposed to outside. The opening has a cross section which defines a linear edge and which is flush with the outer peripheral wall of the holding member 10a. Thus, as to the cross section of the concaved cavity 123a, the arcuate edge would join two opposing ends of the linear edge, gradually curves inwardly and reduces in diametrical size.

Furthermore, the tightening mechanism includes a female coupling member 30 which engages with the male coupling member 20 in order to accomplish clamping the item 40, 50 in the space 13a. Specifically, the female coupling member 30 includes a body engaging with the tail end 22 of the male coupling member 20, and including an engaging end 31 engaging in the concaved cavity 123a. The engaging end 31 has a shape conforming to that of the concaved cavity 123a. Accordingly, the engaging end 31 includes an arcuate surface 311 having a cross section defining an arcuate edge with a curvature substantially the same as that of the concaved cavity 123a. Likewise, FIGS. 4 and 5 show that the arcuate surface 311 and the concaved cavity 123a cooperate to form an interconnecting surface which has an arcuate cross section.

Preferably, the body of the female coupling member 30 is hollow and defines a hole 312 extending therethrough. When the male and female coupling members 20, 30 are engaged with each other, the hole 312 is utilized to receive the tail end 22 of the male coupling member 20 therein. Additionally, the tail end 22 includes an outer threaded section, and the body includes a tightening member 32 including an inner threaded section to coact with the outer threaded section of the tail end 22 in order to securely engage the male and female coupling members 20, 30 and to enable the tightening mechanism to adjust the size of the space 13a. For example, FIG. 5 shows that the female coupling member 30 is engaged in a position of the male coupling member 20 that is more adjacent to the tail end 22 as compared to that shown in FIG. 4, since the item 50 in FIG. 5 has a larger external diameter than that of the item 40 shown in FIG. 4.

Likewise, the second arm 12a may include a slot 124a defined therein depending upon if the concaved cavity 123a would extend through the second arm 12a in order to allow the male coupling member 20 to be inserted through the second arm 12a. So, if the concaved cavity 123a does not extend through the second arm 12a, the second arm 12a would include the slot 124a extending from the concaved cavity 123a to the internal peripheral wall of the holding member 10a such that the male coupling member 20 is able to be inserted through the second arm 12a. Additionally, the slot 124a has an enclosed periphery so it can facilitate the male coupling member 20 being retained in place on the female coupling member 30.

In addition, the female coupling member 30 may include a control handle 33 for facilitating the user to access the tightening mechanism. In this embodiment, the control handle 33 extends in a non-coaxial relation with respect to its body.

The clamping device may further include a clip 14a for attaching the clamping device to a desired position. The clip 14a is disposed on the outer peripheral wall of the holding member 10a. Additionally, the clip 14a is disposed on the proximal ends 111a, 121a of the first and second arms 11a, 12a.

Figure 6:
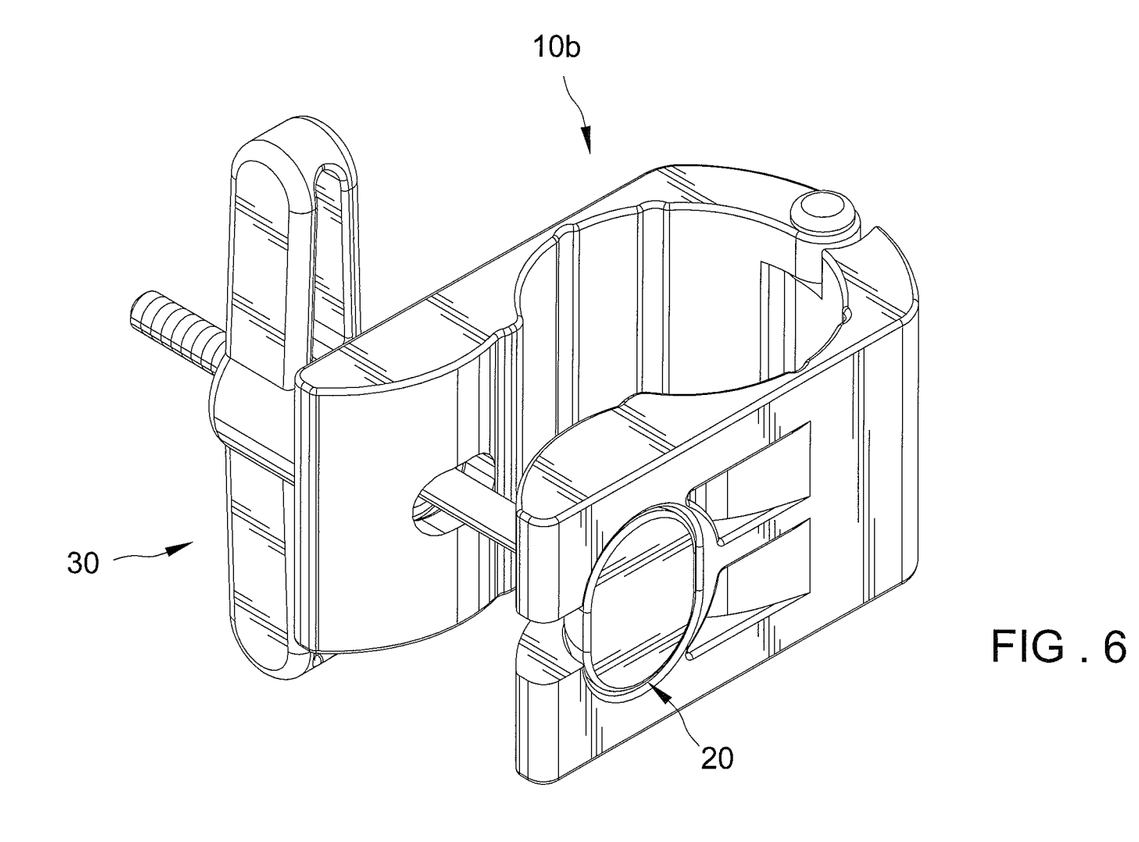
FIG. 6 is a perspective view of a clamping device in accordance with a second embodiment of the present invention.
Figure 7:
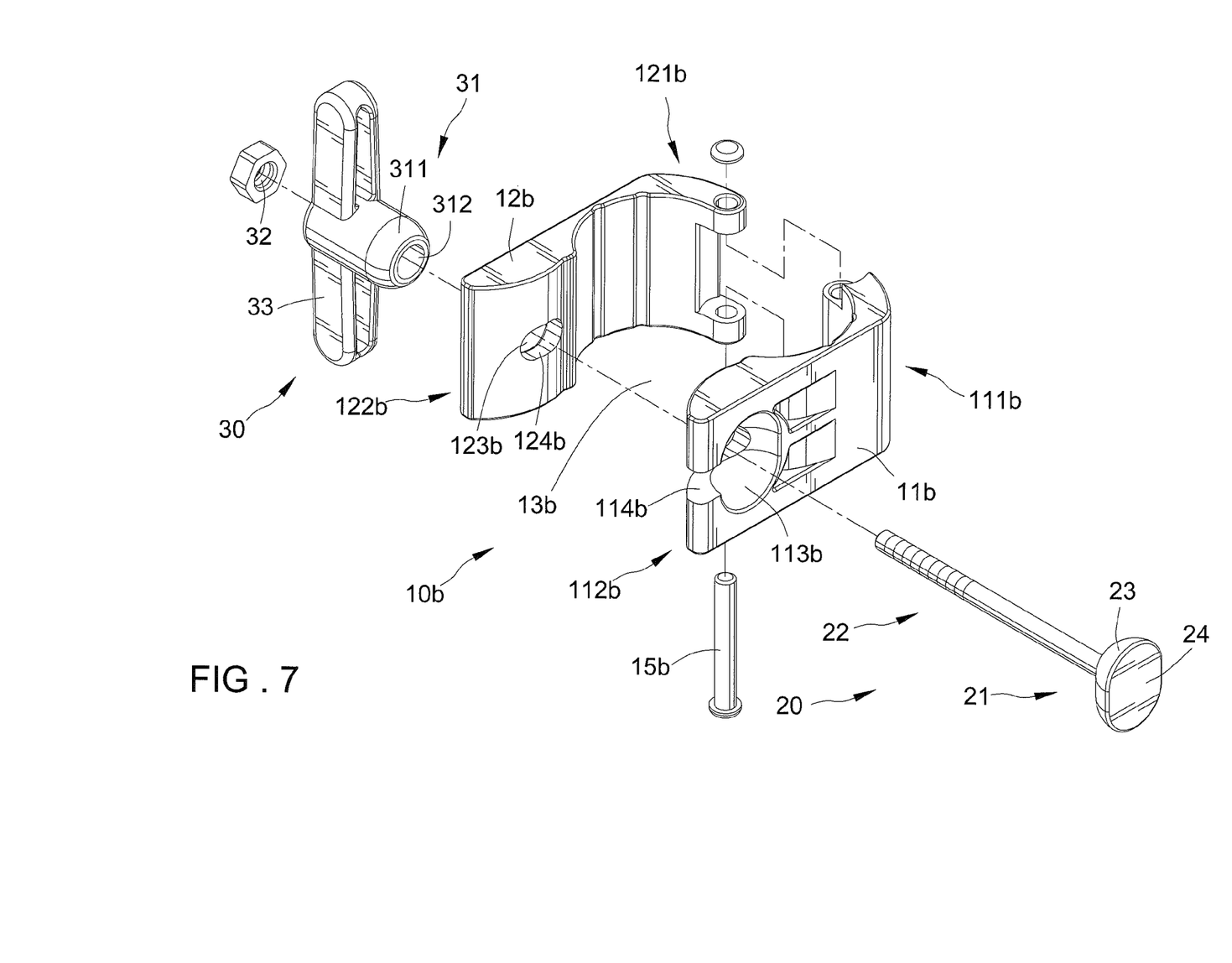
FIG. 7 is an exploded perspective view of the clamping device shown in FIG. 6.

FIGS. 6 and 7 show a clamping device in accordance with a second embodiment of the present invention. The second embodiment differentiates from the first embodiment in that it substitutes the holding member 10a by a holding member 10b. The difference between the holding members 10a and 10b is that the holding member 10b includes a first arm 11b and a second arm 12b formed separately from the first arm 11b. Additionally, the first and second arms 11b, 12b are pivotally connected to each other at their proximal ends 111*b*, 121*b* by a pivot 15*b*. The holding member 10*b* includes a space 13*b* in which an item is adapted to be disposed therein, and the space 13*b* can vary in its size by pivoting the first and second arms 11*b*, 12*b* relative to each other, which is unlike to the first embodiment. In the first embodiment, the space 13*a* is variable in its size, due to the resiliency of the first and second arms 11*a*, 12*a*.

Like the holding member 10*a*, the holding member 10*b* has a cross section including an open end. Accordingly, the proximal end 111*b* of the first arm 11*b* is connected to the proximal end 121*b* of the second arm 12*b*, the first arm 11*b* includes a distal end 112*b*, and the second arm 12*b* includes a distal end 122*b* spaced from the distal end 112*b*. Additionally, the first arm 11*b* has a concaved cavity 113*b* which has a shape the same as that of the concaved cavity 113*a*, and the second arm 12*b* has a concaved cavity 123*b* which has a shape the same as that of the concaved cavity 123*a*. Furthermore, the first arm 11*b* may have a slot 114*b* which has a shape the same as that of the slot 114*a*, and the second arm 12*b* may have a slot 124*b* which has a shape the same as that of the slot 124*a*. It is understood that the aforementioned components in the second embodiment have the same operability and purposes as the first embodiment.

Figure 8:
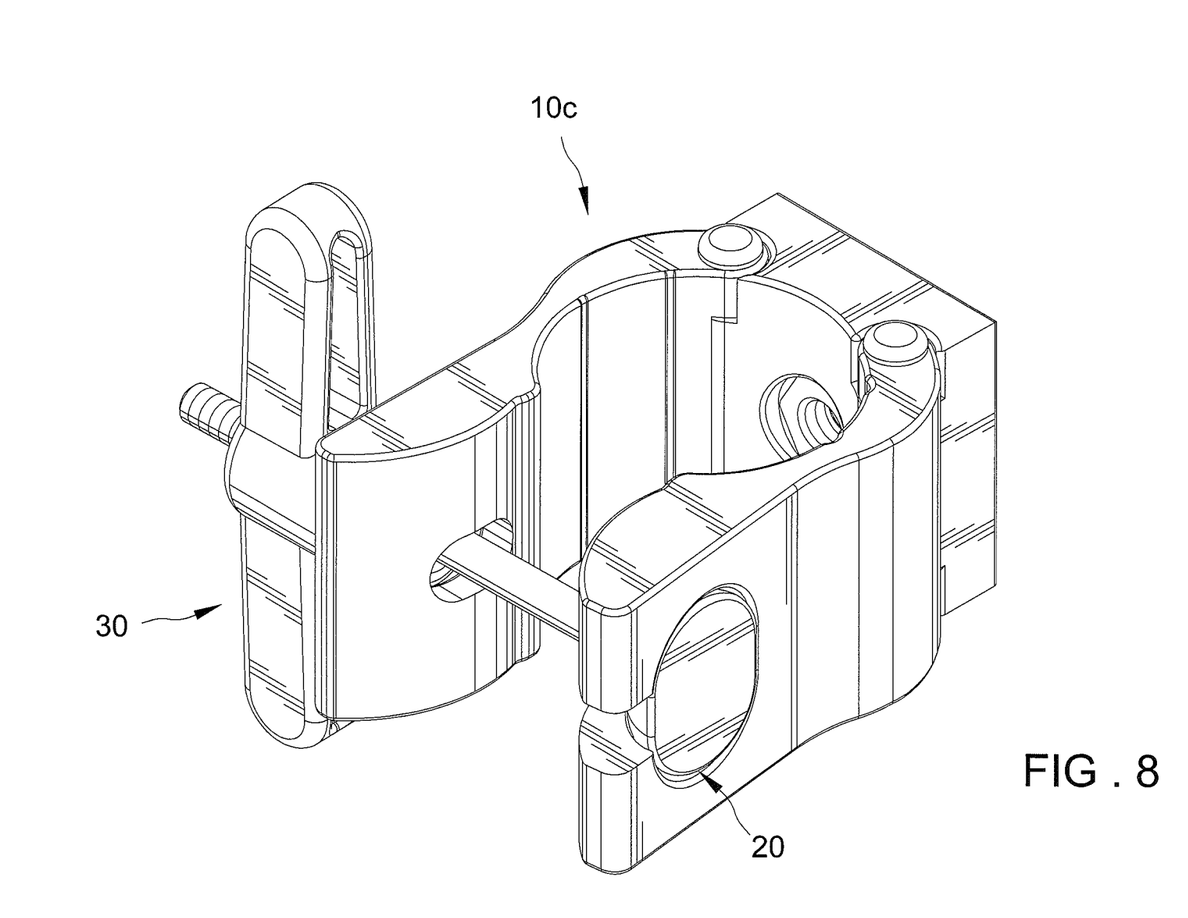
FIG. 8 is a perspective view of a clamping device in accordance with a third embodiment of the present invention.
Figure 9:
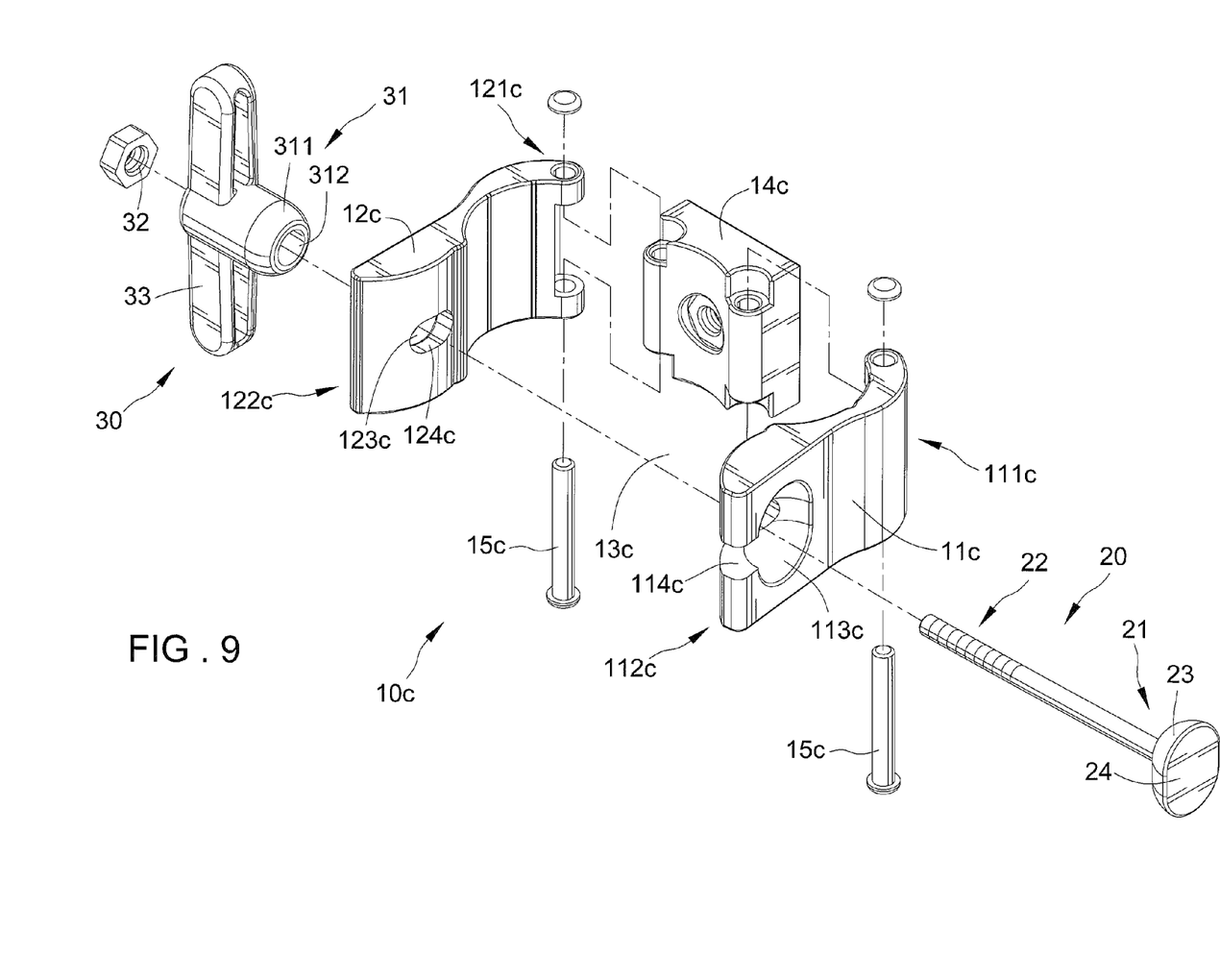
FIG. 9 is an exploded perspective view of the clamping device shown in FIG. 8.

FIGS. 8 and 9 show a clamping device in accordance with a third embodiment of the present invention. The third embodiment differentiates from the first embodiment in that it substitutes the holding member 10*a* by a holding member 10*c* and includes a clip 14*c*. The difference between the holding members 10*a* and 10*c* is that the holding member 10*c* includes a first arm 11*c* and a second arm 12*c* formed separately from the first arm 11*c*. Each of the first and second arms 11*c*, 12*c* are pivotally connected to the clip 14*c* at their proximal ends 111*c*, 121*c* by a pivot 15*c*. Furthermore, the holding member 10*c* includes a space 13*c* in which an item is adapted to be disposed therein. The space 13*c* can vary its size by pivoting the first and second arms 11*c*, 12*c* relative to each other.

Like the holding member 10*a*, the holding member 10*c* has a cross section including an open end. Accordingly, the proximal end 111*c* of the first arm 11*c* is connected to the proximal end 121*c* of the second arm 12*c* through the clip 14*c*, the first arm 11*c* includes a distal end 112*c*, and the second arm 12*c* includes a distal end 122*c* spaced from the distal end 112*c*. The first arm 11*c* has a concaved cavity 113*c* which has a shape the same as that of the concaved cavity 113*a*, and the second arm 12*c* has a concaved cavity 123*c* which has a shape the same as that of the concaved cavity 123*a*. Furthermore, the first arm 11*c* may have a slot 114*c* which has a shape the same as that of the slot 114*a*, and the second arm 12*c* may have a slot 124*c* which has a shape the same as that of the slot 124*a*. It is understood that the aforementioned components in the second embodiment have the same operability and purposes as the first embodiment.

While the specific embodiments have been illustrated and described, numerous modifications come to mind without significantly departing from the spirit of invention, and the scope of invention is only limited by the scope of accompanying claims.

What is claimed is:

1. A clamping device comprising:
    a holding member including a space in which an item is adapted to be disposed therein, wherein the holding member includes a first arm and a second arm, wherein the holding member has a cross section including an open end, wherein the holding member has an outer peripheral wall in which first and second concaved cavities are recessed, and wherein the first concaved cavity is disposed in the first arm and the second concaved cavity is disposed in the second arm, respectively; and
    a tightening mechanism engaged with the holding member and operable to make the holding member clamp the item therein, wherein the holding member includes an inner peripheral wall, which delimits the space, embracing and abutting against an outer peripheral edge of the item;
    wherein the tightening mechanism includes a male coupling member and a female coupling member engaged with the male coupling member, with the male coupling member including a shaft having a head end and a tail end formed opposite to the head end, with the shaft inserted through the first concaved cavity of the first arm and the second concaved cavity of the second arm, with the head end engaged in the first concaved cavity and having an arcuate surface contacting with the arcuate surface of the first concaved cavity, with the female coupling member including a body including an engaging end engaged in the second concaved cavity, with the engaging end having an arcuate surface contacting with the arcuate surface of the second concaved cavity, with the first and second concaved cavities each having arcuate cross sections parallel to and circumferentially around the shaft defining an arcuate edge, wherein the first concaved cavity extends partially through the first arm, wherein the first arm includes a first slot extending perpendicular to the shaft from the first concaved cavity to the open end of the holding member;
    wherein the arcuate surface of the first concaved cavity and the arcuate surface of the head end of the male coupling member aligning the male coupling member in the first concaved cavity, and wherein the arcuate surface of the second concaved cavity and the arcuate surface of the engaging end of the female coupling member aligning the female coupling member in the second concaved cavity, wherein the shaft of the tightening member engaged with the female coupling member is insertable into and removable from the first concaved cavity through the first slot of the first arm and without having to disengage the female coupling member from the male coupling member; and
    wherein the space has a size that is varied by adjusting the tightening mechanism.

2. The clamping device as claimed in claim 1 wherein the first and second arms are disposed symmetrically with respect to each other.

3. The clamping device as claimed in claim 1 wherein the first arm includes a first proximal end, wherein the second arm includes a second proximal end connected to the first proximal end, wherein the first arm includes a first distal end, and wherein the second arm includes a distal end spaced from the first distal end.

4. The clamping device as claimed in claim 3 wherein the first and second arms are formed as an integral piece and from a single material, and wherein the first and second arms have resiliency to enable the space to have a size variation.

5. The clamping device as claimed in claim 3 wherein the first and second arms are pivotally connected to each other at the first and second proximal ends by a pivot, and wherein the first and second arms are pivoted relative to each other to enable the space to have a size variation.

6. The clamping device as claimed in claim 1 further comprising a clip, wherein each of the first and second arms includes a proximal end, with the first and second arms pivotally connected to the clip at their proximal ends by a pivot, and wherein the first and second arms are pivoted relative to each other to enable the space to have a size variation.

7. The clamping device as claimed in claim 1 wherein the tail end is inserted through the first and second arms.

8. The clamping device as claimed in claim 7 wherein the body of the female coupling member is hollow and defines a hole extending parallel to the shaft therein, and wherein the hole receives the tail end of the male coupling member.

9. The clamping device as claimed in claim 8 wherein the tail end includes an outer threaded section, and wherein the body of the female coupling member includes a tightening member including an inner threaded section and disposed therein to coact with the outer threaded section of the tail end to securely engage the first and second coupling members and to enable the tightening mechanism to adjust the size of the space.

10. The clamping device as claimed in claim 1 wherein the second concaved cavity extends partially through the second arm, and wherein the second arm includes a second slot extending perpendicularly to the shaft from the second concaved cavity to the internal peripheral wall of the holding member and having an opening into the open end of the holding member, wherein the shaft of the male coupling member is inserted through the opening of the second slot and into the second concaved cavity of the second arm while the head end is engaged in the first concaved cavity and without having to disengage the female coupling member from the male coupling member.

11. The clamping device as claimed in claim 1 wherein the first slot has an opening into the open end of the holding member, wherein the shaft of the male coupling member is inserted through the opening of the first slot and into the first concaved cavity of the first arm.

\* \* \* \* \*